United States Patent
Hesse et al.

(10) Patent No.: US 6,484,519 B1
(45) Date of Patent: Nov. 26, 2002

(54) MOTOR VEHICLE AIR-CONDITIONING SYSTEM AND A METHOD FOR OPERATING A MOTOR VEHICLE AIR CONDITIONING SYSTEM

(75) Inventors: Ullrich Hesse, Affalterbach (DE); Thomas Tiedemann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,035

(22) PCT Filed: Nov. 25, 2000

(86) PCT No.: PCT/DE00/04190

§ 371 (c)(1),
(2), (4) Date: Aug. 8, 2001

(87) PCT Pub. No.: WO01/42035

PCT Pub. Date: Jun. 14, 2001

(30) Foreign Application Priority Data

Dec. 9, 1999 (DE) .......................................... 199 59 439

(51) Int. Cl.$^7$ .............................. F25B 1/10; F25B 1/00
(52) U.S. Cl. .......................................... 62/116; 62/510
(58) Field of Search .................................... 62/116, 510

(56) References Cited

FOREIGN PATENT DOCUMENTS

| DE | 26 36 024 A | 3/1978 |
| DE | 43 15 924 A | 11/1994 |
| DE | 198 02 613 A | 7/1999 |
| EP | 0 248 296 A | 12/1987 |

*Primary Examiner*—Denise L. Esquivel
*Assistant Examiner*—Melvin Jones
(74) *Attorney, Agent, or Firm*—Michael J. Striker

(57) ABSTRACT

An air conditioner for motor vehicles has a refrigerant circuit in which the refrigerant is brought into a wet vapor state. The refrigerant circuit is comprised among other things of at least one compressor (37) and a pressure ramming machine (14') which serves as an expansion device. By means of the pressure ramming machine (14'), energy is recovered during the expansion process which can be used in the circuit for compressing the refrigerant. In addition, a method for operating an air conditioner for motor vehicles is described, according to which a pressure ramming machine is integrated into the refrigerant circuit and refrigerant is brought into a wet vapor state in the pressure ramming machine (14').

13 Claims, 5 Drawing Sheets

Figure 1:
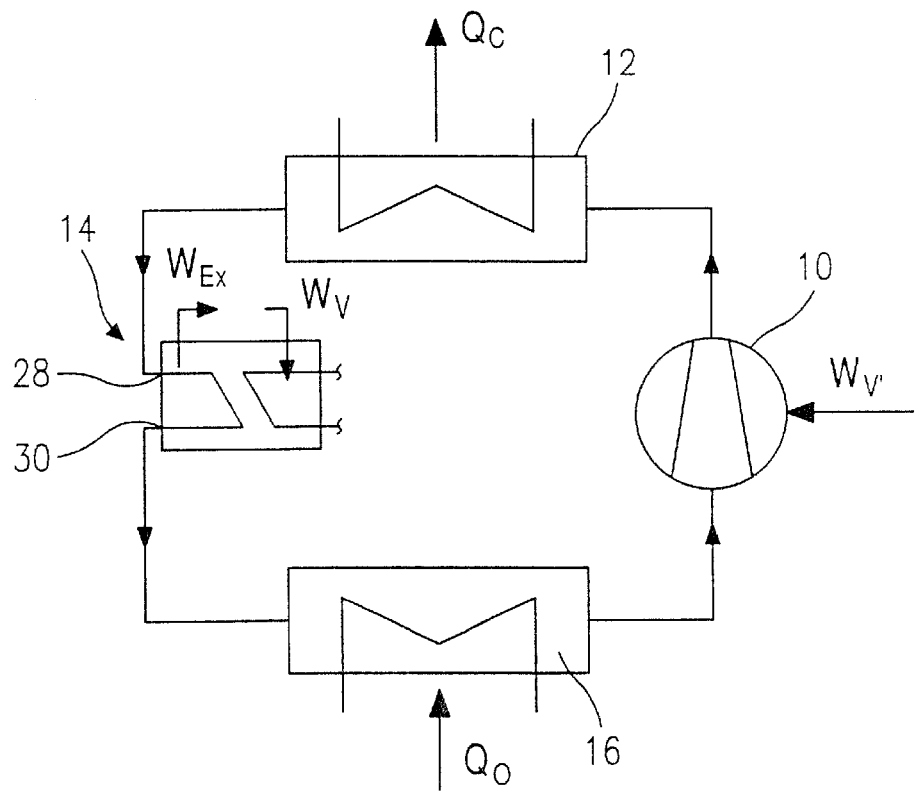

MOTOR VEHICLE AIR-CONDITIONING SYSTEM AND A METHOD FOR OPERATING A MOTOR VEHICLE AIR CONDITIONING SYSTEM

PRIOR ART

The invention relates to an air conditioner for motor vehicles and a method for operating a motor vehicle air conditioner.

Currently, air conditioners for motor vehicles almost exclusively use the so-called cold vapor compression process with tetrafluorethane (R134a) as a refrigerant. The refrigerant circuit is comprised among other things of an evaporator, a compressor, a liquefier, and an expansion valve. An isenthalpic throttling of the refrigerant occurs in the expansion valve. An isentropic, ideal expansion can only be approached with the aid of an expansion engine; such machines have not been used for a long time in vehicle air conditioners. There are several reasons for this. For one thing, the energetic improvement which could have been achieved by means of expansion engines was relatively low and was not in any proportion with the higher cost in comparison to a simple expansion valve. For another thing, the expansion engines that were previously possible could only be controlled with a considerable increase in technical expense; a speed regulation or a control of the inlet and outlet valves would be required for this. Primarily, with the machines that were previously possible, rapid destruction or a high amount of wear during operation was to be expected, with refrigerant expanding out of the fluid.

The object of the invention is to produce an air conditioner for vehicles which, with a design cost that is only slightly higher than conventional air conditioners, is distinguished by a significant increase in performance. In addition, a method for operating an air conditioner should be disclosed, which results in a higher performance number.

ADVANTAGES OF THE INVENTION

The object of improving an air conditioner is attained by virtue of the fact that the air conditioner has a refrigerant circuit in which refrigerant is brought into a wet vapor state and has at least one compressor and an expansion device which is embodied as a pressure ramming machine.

The object of producing a novel method is attained according to the invention by virtue of the fact that a pressure ramming machine is integrated into a refrigerant circuit and refrigerant is brought at least partially into a wet vapor state in the pressure ramming machine. The refrigerant is expanded from a high pressure level to a low pressure level. Preferably, refrigerant is simultaneously compressed from a low pressure level to a high pressure level.

A pressure ramming machine is distinguished by a simple manufacture. The rotor can, for example, be comprised of extruded profiles and the housing parts can be milled out of aluminum or produced as diecast parts. The rotor speed, which is on an order of magnitude of e.g. 10,000 to 20,000 rpm results in the fact that no particularly high demands are placed on strength. In contrast to other expansion engines, in pressure ramming machines, no control or regulation is required, preferably not even in the inflow and the outflow of the refrigerant. Since no valves are required, the air conditioner can be operated with a high fluid content in the wet vapor zone. Furthermore, the pressure ramming machine permits operation without a drive mechanism because a pressure ramming machine can be driven exclusively by the impetus forces of the substance expanding inside it, in this instance a refrigerant, as experiments have shown. With the pressure ramming machine, an expansion can and does take place, preferably even in the wet vapor zone, which has until now been avoided in expansion engines due to their susceptibility in terms of the destruction of or wear on the moving parts, in particular the blades in expansion turbines. For this reason, even expansion engines are almost exclusively used in cold gas processes where such problems do not occur.

Advantageous embodiments of the invention constitute the subjects of the dependent claims.

Preferably, the refrigerant is carbon dioxide which in the refrigerant circuit, e.g. when used in vehicle air conditioners, is brought at least temporarily from a supercritical state into a wet vapor state during expansion, independently of the ambient temperature. This embodiment of the air conditioner according to the invention is particularly significant. The combination of carbon dioxide and the use of a pressure ramming machine results in significant advantages. With carbon dioxide as a refrigerant, greater energetic improvements and an increase in cooling performance can be achieved by an expansion engine, namely in comparison to the tetrafluorethane used previously. According to a preferred embodiment, the air conditioner according to the invention can have a transcritical or subcritical process guidance, depending on the temperature of the heat sink, i.e. the ambient temperature during operation of the air conditioner or the internal temperature during operation of the heat pump. Since the carbon dioxide has a critical point of approximately 31° C., operating conditions can occur in which the refrigerant circuit runs in the transcritical range, with an expansion from the supercritical into the wet vapor state or runs in the subcritical range in which the refrigerant can be converted from a fluid state into a wet vapor state.

According to a preferred embodiment, the pressure ramming machine and compressor are connected to each other so that power released during the expansion process in the pressure ramming machine is used to compress the refrigerant, as a result of which the drive mechanism for the compressor can be considerably smaller in size. The cost for the pressure ramming machine is thus at least partially recouped. The expansion work is advantageously at least partially reused in the pressure ramming machine itself as compression work so that the drive work still required for the additional compressor still required is considerably lower in comparison to an operation without a pressure ramming machine. In this embodiment, the compressor section of the pressure ramming machine is correspondingly integrated into the refrigerant circuit. However, it is also possible to provide several refrigerant circuits or branched refrigerant circuits; the compressor section is then integrated into one of these circuits and the refrigerant can mix with the medium of the circuit into which the compressor section is integrated.

The compressor, which is provided as an auxiliary compressor in addition to the pressure ramming machine, is of a lower performance than a refrigerant circuit without a pressure ramming machine.

The auxiliary compressor can be connected in series or in parallel with the compressor section of the pressure ramming machine.

According to a preferred embodiment, the pressure ramming machine is driven exclusively by the impetus forces of the mass flows of refrigerant flowing through it, for which, in principle, only a very low drive power is required.

One embodiment of the method according to the invention provides for the use of carbon dioxide as a refrigerant, which can be brought into a wet vapor state in the pressure ramming machine depending on the ambient temperature.

Other features and advantages of the invention ensue from the following description and the following drawings which are referred to in the description.

DRAWINGS

Figure 2:
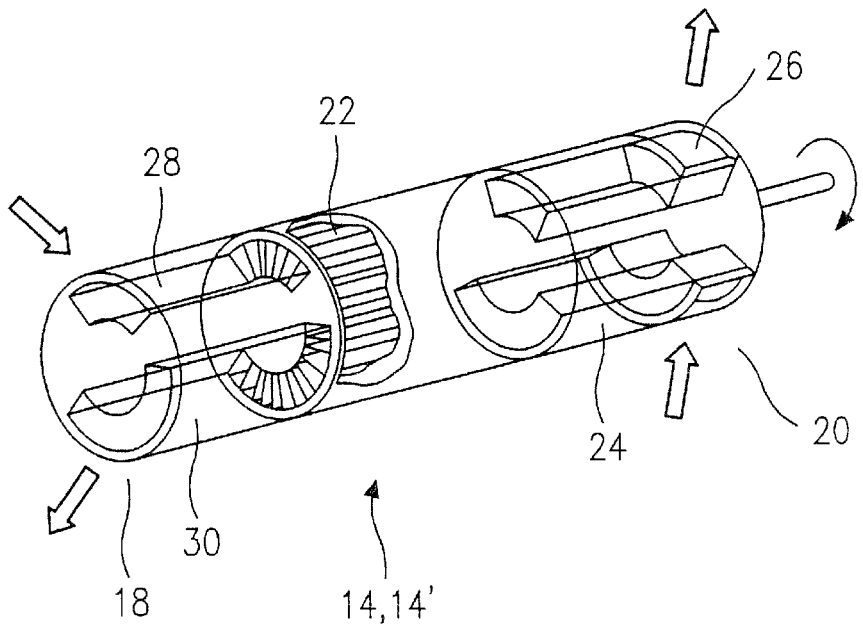
Figure 3:
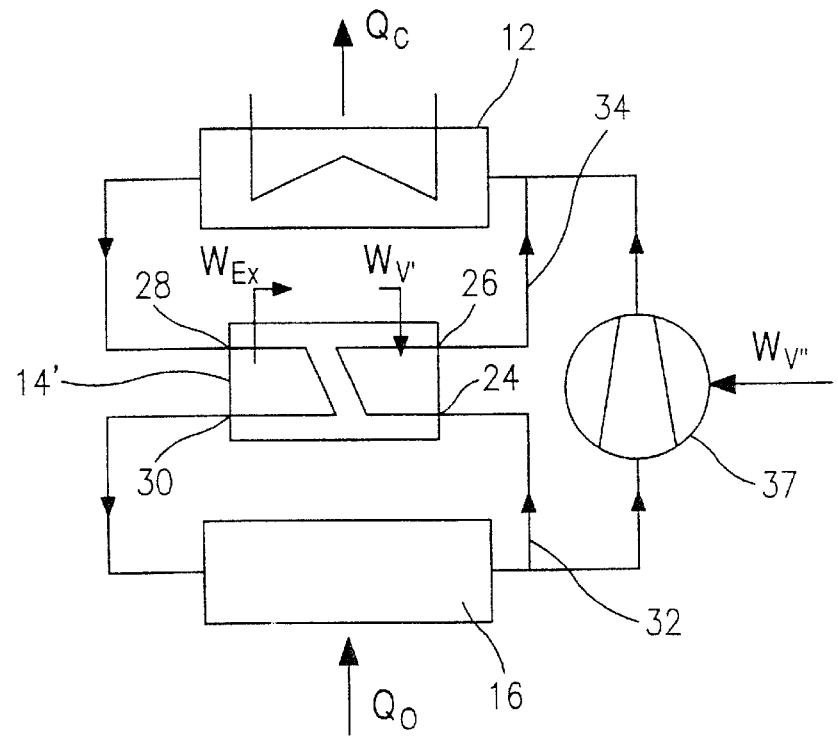
Figure 4:
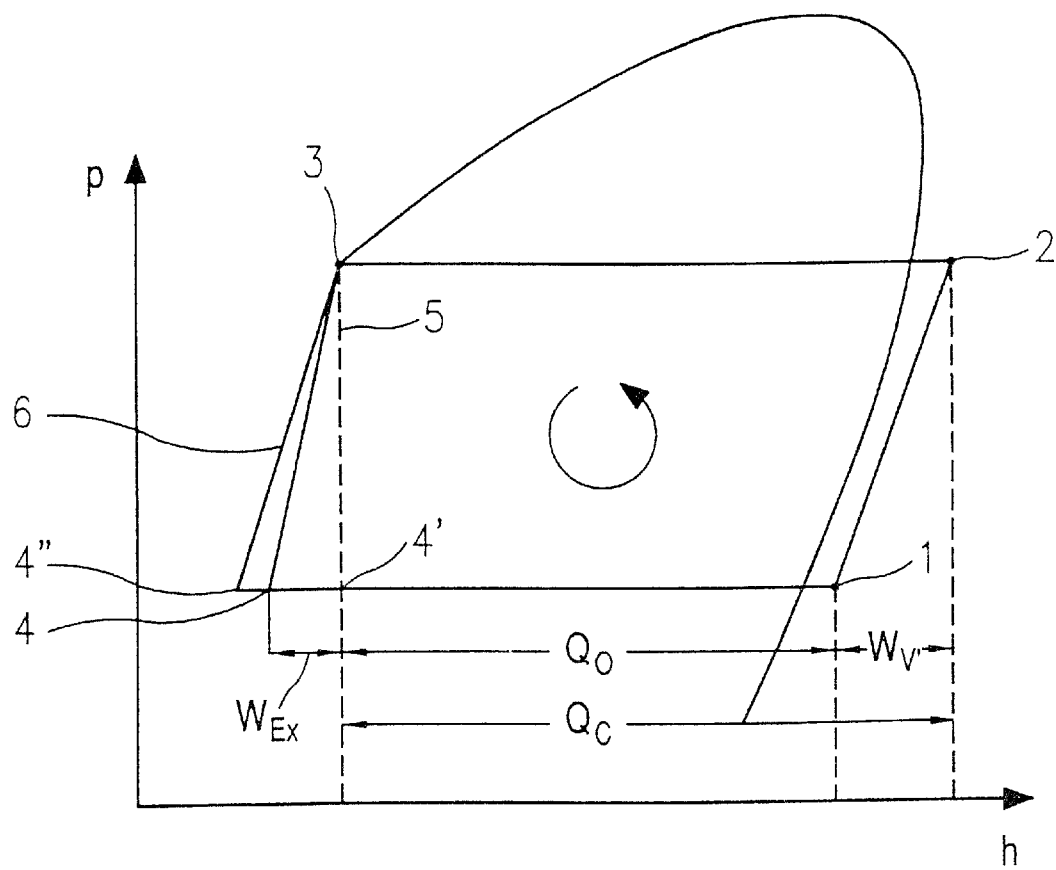
Figure 5:
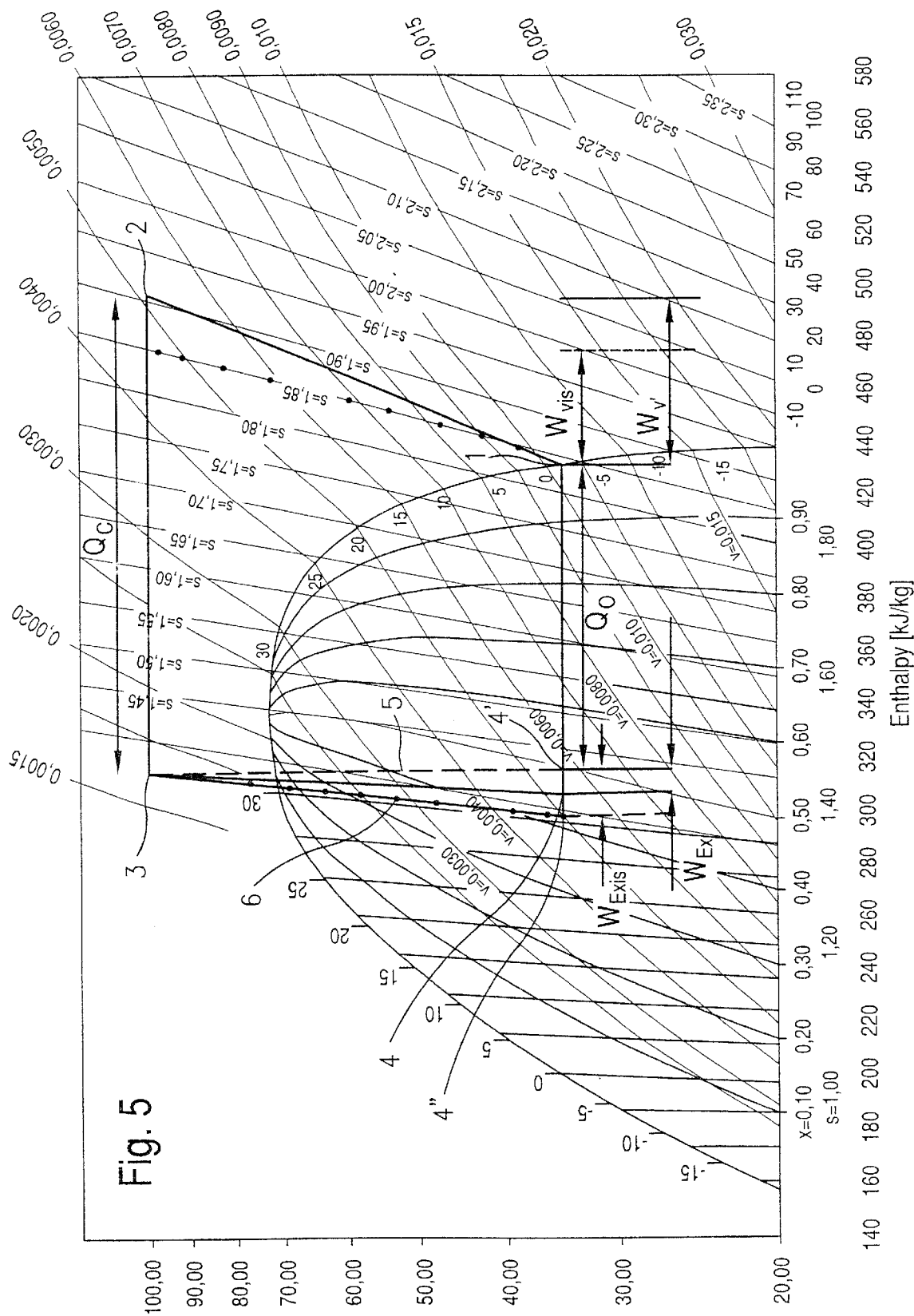

FIG. 1 depicts a first embodiment of the air conditioner according to the invention, which has a pressure ramming machine, showing the form of its refrigerant circuit, FIG. 2 schematically depicts a pressure ramming machine of the kind that is used in the air conditioner according to the invention, FIG. 3 shows a second embodiment of the air conditioner according to the invention, FIG. 4 shows a pressure/enthalpy graph for the air conditioner according to the invention according to FIG. 3 during subcritical process guidance and without the influence of the auxiliary compressor, FIG. 5 shows a pressure/enthalpy graph for the air conditioner according to the invention during transcritical process guidance, in a depiction without a division of the compression work $W_v$ into recovered expansion work $W_{Ex}$ and the work $W_{vz}$ of the auxiliary compressor.

Figure 7:
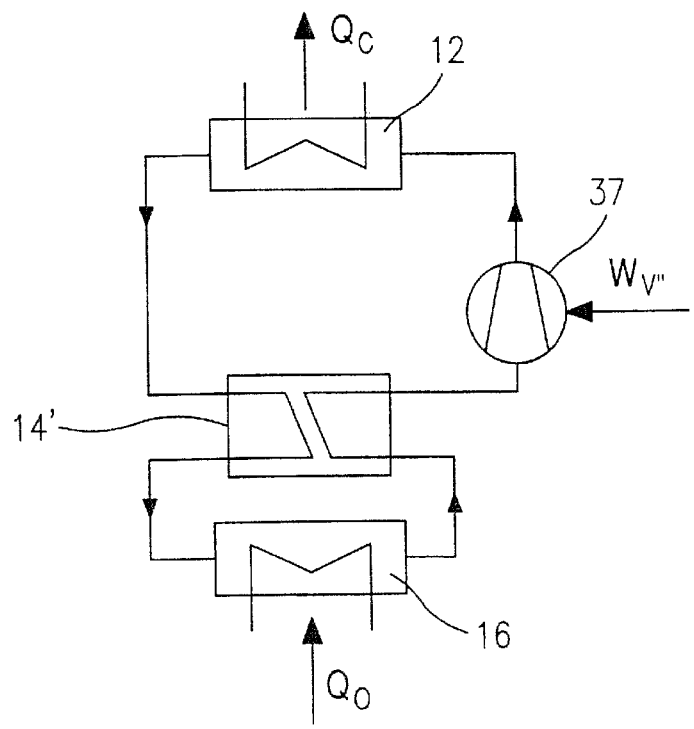
Figure 6:
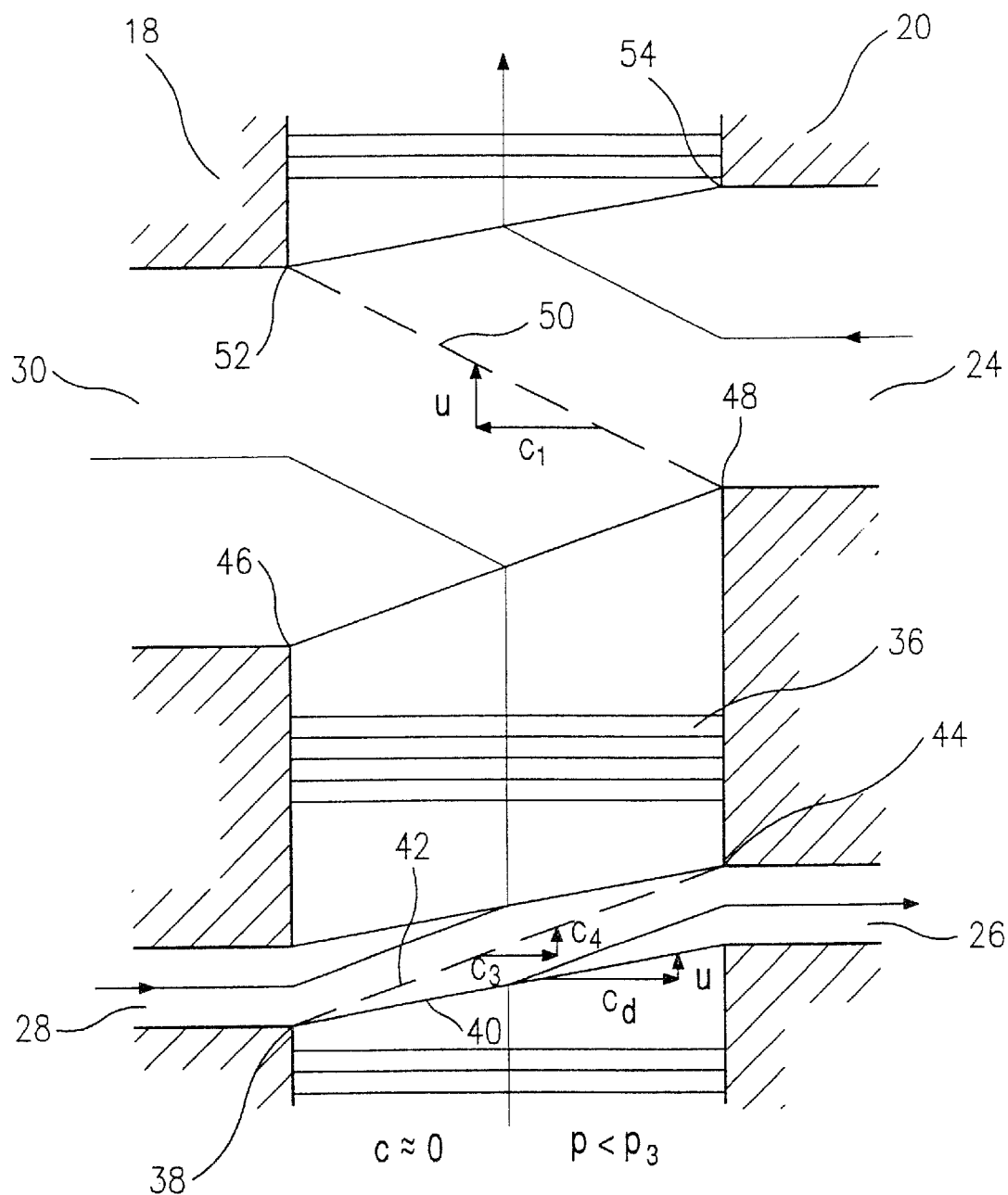

FIG. 6 shows a circumferential developed view of the rotor of the pressure ramming machine shown in FIG. 2, and FIG. 7 shows a third embodiment of the air conditioner according to the invention.

DESCRIPTION OF THE EXEMPLARY EMBODIMENTS

FIG. 1 depicts an air conditioner for a motor vehicle by showing its refrigerant circuit. Carbon dioxide is used as a refrigerant and can be brought to a supercritical pressure. Listed in the flow direction, the refrigerant circuit includes a compressor 10, a gas cooler or liquefier 12, a pressure ramming machine 14 that constitutes an expansion device, and an evaporator 16. These elements are connected to one another via lines. In this embodiment, the pressure ramming machine 14 has an expansion side and a compressor side, as described in detail below in conjunction with FIG. 2. The expansion side is integrated into the refrigerant circuit shown and the compressor side is integrated into a second circuit that is not shown in detail; the second circuit does not absolutely have to be used for the air conditioning or is used exclusively for air conditioning the passenger compartment. The refrigerant of both circuits can partially mix in this embodiment.

The air conditioner according to the invention works as follows: in the compressor 10, the carbon dioxide is compressed in the process of which the compressor 10 absorbs an energy $W_v$. In the subsequent gas cooler or liquefier 12, the heat energy $Q_C$ is extracted from the carbon dioxide. When used in vehicle air conditioners, the carbon dioxide is frequently in the supercritical state during year-round use. In the subsequent pressure ramming machine 14, the carbon dioxide expands into the wet vapor range in the course of which an energy $W_{Ex}$ is recovered by the pressure ramming machine. This energy $W_{Ex}$ is used in the compressor section to compress refrigerant, in the process of which the compressor section requires an energy $W_v$ for its operation, which is supplied by the energy $W_{Ex}$. In the evaporator 16, ore energy $Q_o$ is supplied to the carbon dioxide so that the carbon dioxide then assumes a state close to or at the threshold between wet vapor and vapor or is in purely vaporous form.

The pressure ramming machine 14 is shown in FIG. 2. In one possible embodiment, the pressure ramming machine 14 has a first housing side, referred to below as the expansion side 18, and disposed axially opposite from this, has a second housing side, referred to below as the compressor side 20, as well as a rotor 22 disposed between them, which is shown in a partially sectional view.

On the compressor side 20, the pressure ramming machine 14 has an inlet 24 and an outlet 26, depicted by respective arrows and corresponding conduits. An inlet 28 and an outlet 30 are likewise provided on the expansion side 18, likewise indicated by arrows and conduits. It should be noted that the conduits for the inlet 24 and the outlet 30 have a greater cross section than the conduits for the outlet 26 and the inlet 28.

Since both an expansion and a compression take place in the ramming machine 14, the embodiment shown in FIG. 1 can be further modified in the manner shown in FIG. 3 so that the pressure ramming machine 14 simultaneously also functions as a compressor in the refrigerant circuit. The use of the energy $W_{Ex}$ for compression consequently also takes place inside the pressure ramming machine 14 itself. In order to differentiate from the embodiment according to FIG. 1, the pressure ramming machine in FIG. 3 is labeled 14' and is alternatively likewise labeled 14' in FIG. 2. Downstream of the evaporator 16, a line 32 leads indirectly into the pressure ramming machine 14', in other words into its compressor section between the inlet 24 and the outlet 26, and leads to the liquefier 12 by means of a line 34 for compressed refrigerant. Parallel to the compressor section in the pressure ramming machine 14', an auxiliary compressor 37 is provided, which consumes an energy $W_{v''}$ during its operation.

In the pressure/enthalpy graph shown in FIG. 4, the supplied and discharged energy quantities described above are depicted by way of example for a subcritical process guidance; for the sake of simplicity, the influence of the auxiliary compressor is not taken into account. From point 1 to point 2, the refrigerant is compressed through the supply of the energy $W_v$; from point 2 to point 3 in the liquefier 12, the refrigerant is liquefied both isobarically and by being supplied with the energy $Q_C$ or is brought to the threshold between fluid and wet vapor, from point 3 to point 4, the refrigerant is released into the wet vapor range through the delivery of the energy $W_{Ex}$, and finally, from point 4 to point 1, the refrigerant is converted completely into the vaporous state in the evaporator through the consumption of the energy $Q_o$. The energy recovery that can be achieved with the air conditioner according to the invention in comparison to the air conditioners provided with an expansion valve can be clearly inferred from FIG. 4. The dashed line 5 namely depicts the isenthalpic expansion which the refrigerant undergoes from point 3 to point 4' in the expansion valve. No additional energy $W_{Ex}$ can be recovered from the prior circuit in order to drive a compressor, for example. The air conditioner according to the invention comes significantly closer to the ideal circular process which is characterized by an isentropic expansion from point 3 to point 4", which is symbolically depicted by the line 6. In FIG. 4, it is also clear that with the air conditioning system according to the invention, the energy consumption $W_v$, in the compressor 10 remains unchanged in comparison to the prior process, while the usable refrigerating energy $Q_o$ increases by the amount $W_{Ex}$. Precisely stated, the energy quantities shown in the pressure/enthalpy graph are quantities of specific energy.

The air conditioner according to the invention can have not only a subcritical process guidance but also a transcritical process guidance as shown in the graph according to FIG. 5, where for the sake of simplicity, the influence of the auxiliary compressor is not shown. Whether a subcritical or supercritical process is required is a function, among other things, of the ambient temperature.

The reference numerals already used in connection with FIG. 4 are used again in FIG. 5. In the process course shown, the point 1 is disposed on the saturation line between the vaporous and wet vapor states. From point 1 to point 2, the refrigerant is compressed through the supply of the energy $W_v$, where dashed lines are used to also depict an isentropic compression through a supply of energy $W_{vis}$. At point 2, the refrigerant is in the supercritical range which it also does not leave when it flows through the gas cooler/liquefier 12 and undergoes an isobaric state change until it reaches the point 3 and gives off the energy $Q_C$. From point 3 to point 4, the refrigerant in the pressure ramming machine 14' is released into the wet vapor range while giving off the energy $W_{Ex}$. $W_{Exis}$ symbolizes the energy which would have to be produced in an isotropic expansion. From point 4 to point 1, the refrigerant passes through the evaporator in which it absorbs energy.

Based on FIGS. 2 and 6, the function of the pressure ramming machine 14' can now be explained in brief. For the sake of better comprehension, the reference numerals for the inlets and outlets 24 to 30 used in connection with FIG. 2 have also been used in FIGS. 3 and 6.

The states inside a so-called cell, i.e. the space between neighboring blades of the rotor, during one rotation are described below; the states of the refrigerant in the cell change during the rotation. In FIG. 6, a cell is symbolically provided with the reference numeral 36. The cell 36 is moved from bottom to top in the developed view according to FIG. 6. For the sake of clarity, it is first assumed that the ambient pressure and ambient temperature prevail in a refrigerant that is at rest in the cell. When the cell 36 has reached the opening edge 38 of the inlet 28, a pressure wave is introduced into the cell 36 because the pressure of the refrigerant in the inlet 28 is greater than that in the cell 36. The pressure wave moves into the cell 36 at the speed $c_d$. The total speed of the pressure wave is symbolized by a line 40, which is produced by superposing the speed $c_d$ and the circumference speed u. The refrigerant disposed in the cell 36 upon reaching the opening edge 38 is subjected to an abrupt pressure and speed increase. A temperature increase must also be recorded. The refrigerant that is to be expanded flows from the inlet 28 into the cell 26 and the then-compressed refrigerant then flows out of the cell 36 via the outlet 26. When the pressure wave reaches the compressor side 20, the entire content of the cell has been accelerated to the speed $C_3$. The superposition of the speed $C_3$ and the circumference speed u yields the imaginary dividing line 42 depicted with dashed lines in FIG. 6, which constitutes the boundary between the refrigerant flowing in via the inlet 28 and the compressed, escaping refrigerant that was originally disposed in the cell 36. The closing edge 44 for the outlet 26 must be disposed so that it coincides with the arrival line dividing line 42 so that no undesirable reflection of the pressure waves occurs on the compressor side 20 and a maximal refrigerant quantity is expanded and compressed.

After the cell 36 closes, it conveys the refrigerant, which has flowed in, further along. Because of the impetus of the refrigerant and the propagating pressure wave, the pressure in the cell 36 decreases on the expansion side 18. In the cell 36, at 18 and 20 there is an axial speed c of approximately 0. Upon reaching the opening edge 46 of the outlet 30, in the ideal case the pressure $p_4$ prevails here. Due to the reflection of the pressure wave against the side 20 and the expansion of the refrigerant, the compressed refrigerant flows out. When the opening edge 48 of the inlet 24 is reached, refrigerant, which is to be compressed, arrives in a replenishing flow because it is sucked into the cell 36 as a result of the gas impetus. The imaginary dividing line 50 separates the outflowing refrigerant from the incoming. The correctly timed delay of the flow and the prevention of a reflection can be prevented by the correct disposition of the closing edges 52 and 54; here, too, the disposition of the flow edges 52 is once more matched to the speed of the outflowing gas $c_4$ and the circumference speed u.

The pressure compensation otherwise takes place inside a cell at the speed of sound, which is why the pressure ramming machine 14' has a high performance at rotor speeds of e.g. only 10,000 to 20,000 rpm, which are advantageously low for a flow machine of this performance class.

Although an external drive mechanism can naturally be provided for the rotor, embodiments can also be achieved in which merely the impetus forces of the refrigerant flowing into the pressure ramming machine 14' are sufficient to drive the rotor 22.

Instead of the parallel connection of the auxiliary compressor 37, it can also be connected in series with the compressor section of the pressure ramming machine 14', as shown in FIG. 7. The entire refrigerant flow is brought to a first pressure level by the pressure ramming machine 14' and then in the auxiliary compressor 37, it is brought to the pressure that is required in the liquefier or gas cooler 12. The embodiment according to FIG. 7 has the advantage over the one shown in FIG. 3 that fewer lines are provided and fewer internal leakage losses are expected as a result of the lower pressure difference. In addition, the final compression temperature in the machine is lower, as a result of which fewer thermodynamic losses are produced. It is also advantageous that the machine can be freely placed in the vicinity of the compressor without greater deviations from conventional system connections.

As can be seen from the embodiments shown, there is the advantage that no valve is provided, which makes the air conditioner very favorable and is a prerequisite for a low susceptibility to malfunction.

The specialist can easily deduce heat pump connections from the system connections shown, where corresponding reversing valves must be provided for the alternative heating, cooling, or dehumidifying operation.

What is claimed is:

1. An air conditioner for motor vehicles, with a refrigerant circuit In which refrigerant flows, said circuit comprising
   at least one compressor (10; 37) and
   a pressure ramming machine (14; 14'), which constitutes an expansion device, wherein said refrigerant within said circuit is brought into a wet vapor state within the pressure ramming machine (14; 14').

2. The air conditioner according to claim 1, characterized in that the refrigerant is carbon dioxide and the air conditioner is designed so that the carbon dioxide can be brought from a supercritical state into a wet vapor state in the refrigerant circuit.

3. The air conditioner according to claim 2, characterized in that the refrigerant circuit has a transcritical or subcritical process guidance depending on the ambient temperature.

4. The air conditioner according to claim 1, characterized in that the pressure ramming machine (14) and the compressor (10) are connected to each other so that energy released during the expansion process in the pressure ramming machine (14; 14') is used for the compression (10).

5. The air conditioner according to claim 1, characterized in that the pressure ramming machine (14') has a compressor section and this compressor section is integrated into the refrigerant circuit so that the pressure ramming machine (14') simultaneously also constitutes the compressor.

6. The air conditioner according to claim 5, characterized by means of an auxiliary compressor (37) which is connected in series with the compressor section of the pressure ramming machine (14').

7. The air conditioner according to claim 6, characterized in that the auxiliary compressor (37) is disposed downstream of the compressor section.

8. The air conditioner according to claim 5, characterized by means of an auxiliary compressor (37) which is connected in parallel with the compressor section of the pressure ramming machine (14').

9. The air conditioner according to claim 1, characterized in that the pressure ramming machine (14; 14') is driven exclusively by impetus forces of the refrigerant expanding inside it.

10. The air conditioner according to claim 1, characterized in that the refrigerant circuit is embodied so that the air conditioner can alternatively be operated as a heat pump.

11. A method for operating an air conditioner for motor vehicles, characterized by the following steps:

a pressure ramming machine (14; 14') is integrated into the refrigerant circuit and refrigerant is brought at least partially into a wet vapor state in the pressure ramming machine (14; 14').

12. The method according to claim 11, characterized in that carbon dioxide is used as the refrigerant and can be brought from a supercritical state into a wet vapor state in the pressure ramming machine (14; 14'), depending on the ambient temperature.

13. The method according to claim 12, characterized in that a transcritical or subcritical process guidance is executed depending on the ambient temperature.

* * * * *